US010611254B2

(12) United States Patent
Köhler et al.

(10) Patent No.: US 10,611,254 B2
(45) Date of Patent: Apr. 7, 2020

(54) CHARGING CABLE UNIT FOR A CHARGING COLUMN OF AN ELECTRIC FILLING STATION AND USE OF SUCH A UNIT

(71) Applicant: Dr. Ing. h.c. F. Porsche Aktiengesellschaft, Stuttgart (DE)

(72) Inventors: David Köhler, Bietigheim-Bissingen (DE); Stefan Götz, Forstern (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 50 days.

(21) Appl. No.: 16/011,947

(22) Filed: Jun. 19, 2018

(65) Prior Publication Data

US 2019/0016220 A1     Jan. 17, 2019

(30) Foreign Application Priority Data

Jul. 12, 2017 (DE) .................. 10 2017 115 637

(51) Int. Cl.
*H01M 10/44* (2006.01)
*H01M 10/46* (2006.01)
*B60L 11/18* (2006.01)
*H02G 11/00* (2006.01)
*B60L 53/31* (2019.01)
(Continued)

(52) U.S. Cl.
CPC .......... *B60L 11/1825* (2013.01); *B60L 53/18* (2019.02); *B60L 53/31* (2019.02); *H02G 11/00* (2013.01); *H02J 7/00* (2013.01); *B60L 2240/36* (2013.01); *B60L 2270/00* (2013.01); *B60L 2270/32* (2013.01); *H02G 3/0493* (2013.01)

(58) Field of Classification Search
CPC ......... H02J 7/355; H02J 7/0042; H02J 7/0091
USPC ................................ 320/107, 109, 150, 153
See application file for complete search history.

(56) References Cited

U.S. PATENT DOCUMENTS 5,412,304 A * 5/1995 Abbott .................... H01F 38/14
320/108
6,546,899 B1   4/2003 Friedrich et al.
(Continued)

FOREIGN PATENT DOCUMENTS

DE      102007041110 A1    3/2009
EP         0800234 A1   10/1997
(Continued)

OTHER PUBLICATIONS

English Translation of the Notification of Reason for Rejection for Japanese Application No. 2018-129791, dated Jun. 18, 2019, 4 pages.

(Continued)

*Primary Examiner* — Edward Tso
(74) *Attorney, Agent, or Firm* — RatnerPrestia

(57) ABSTRACT

A charging cable unit for a charging column of an electric filling station has a cooling unit and a charging cable which is preferably provided with cable shoes. The coding unit includes a heat exchanger with first connections and second connections. The charging cable has a secondary coolant circuit that is fluidically connected to the second connections. The cooling unit is designed to cool the secondary coolant circuit if the first connections are fluidically connected to a common primary coolant circuit of the electric filling station. Also described is a mounting method using such a charging cable unit.

16 Claims, 4 Drawing Sheets

(51) Int. Cl.
*B60L 53/18* (2019.01)
*H02J 7/00* (2006.01)
*H02G 3/04* (2006.01)

(56) References Cited

U.S. PATENT DOCUMENTS

| | | | |
|---|---|---|---|
| 2012/0043935 A1 | 2/2012 | Dyer et al. | |
| 2014/0292260 A1* | 10/2014 | Dyer | B60L 53/55 320/107 |
| 2015/0054460 A1* | 2/2015 | Epstein | B60L 11/187 320/109 |
| 2015/0306974 A1* | 10/2015 | Mardall | H01M 10/625 320/150 |
| 2019/0016222 A1* | 1/2019 | Reber | B60L 53/18 |

FOREIGN PATENT DOCUMENTS

| | | |
|---|---|---|
| EP | 2909893 A1 | 8/2015 |
| EP | 3282211 A1 | 2/2018 |
| JP | 2002528326 A | 9/2002 |
| RU | 172326 U1 | 7/2017 |
| WO | 2014062836 A1 | 4/2014 |
| WO | 2016163363 A1 | 10/2016 |

OTHER PUBLICATIONS

Indian Examination Report for Indian Application No. 201814021541, dated Dec. 9, 2019, with translation, 5 pages.

\* cited by examiner

CHARGING CABLE UNIT FOR A CHARGING COLUMN OF AN ELECTRIC FILLING STATION AND USE OF SUCH A UNIT

CROSS-REFERENCE TO RELATED APPLICATION

This application claims priority to German Patent Application No. DE 10 2017 115 637.2, filed Jul. 12, 2017, which is incorporated by reference herein in its entirety.

FIELD OF THE INVENTION

The present invention relates to a charging cable unit for a charging column of an electric filling station. The present invention additionally relates to the use of such a charging cable unit.

BACKGROUND OF THE INVENTION

In electrical engineering, a charging station refers to any stationary apparatus or electrical installation which serves to supply energy to mobile battery-operated devices, machines or motor vehicles by a simple placing or plugging-in operation without the energy store—for instance the traction battery of an electric car—having to be removed. Charging stations for electric cars are colloquially also referred to as "electric filling stations" and can comprise a plurality of charging points which, depending on the design, are characterized as "charging columns".

Known here are in particular direct-current quick-charging systems (high performance charging, HPC) such as the so-called combined charging system (CCS) which is widespread in Europe. In the case of the generic direct-current charging, direct current is fed directly into the vehicle from the charging column and for this purpose provided by a high-power rectifier from the electricity network or by large buffer accumulators at solar filling stations. Within the vehicle there is situated a battery management system which communicates with the charging column in order to adjust the current intensity or to terminate the operation when a capacity limit is reached.

According to the prior art, the power electronics required for this purpose is customarily integrated in the charging column and can be loaded up to a power limit of 50 kW. Since the direct-current connections of the charging column are directly connected to corresponding connections of the traction battery, low-loss high charging currents can thus be transmitted, which allows short charging times but also results in heat generation.

In order to keep the weight and the flexibility of the charging cable low for the user, cable-cooling systems having charging cables through which a liquid flows are described in the literature. Such systems sometimes present problems upon installation, operation and maintenance. In particular, the charging cable is exposed to a high degree of wear through regular use, weathering or inappropriate handling. However, its replacement and its installation as a rule require a mounting of the components of the cooling system or a connection of the cable cooling circuit to the cooling system of the charging column. For this purpose, cooling liquid has to be filled in, on the one hand, and, in addition, the cooling circuit has to be vented for problem-free operation. These activities are time-consuming, error-prone and tie maintenance teams in situ to the charging columns.

Alternatives with leakage-free or even dead-volume-free plug connectors which could avoid a filling or venting operation are disproportionately expensive and sensitive. Thus, for instance, DE102007041110B4, which is incorporated by reference herein, discloses an electrical connection with a connection line and plug connector which each have a cavity for cooling liquid. The plug connector further has a valve which closes a first opening of the cavity if the connection point of the connection line is uncoupled from the plug connector; the connection point has a corresponding valve which closes a second opening of the cavity if the connection point is uncoupled from the plug connector.

EP800234B1, which is incorporated by reference herein, relates to a plug coupling for supply or monitoring and control lines, comprising a plug socket and plug which form three coupling points consisting of coupling pins on the one hand and coupling sleeves on the other hand, wherein, besides the coupling points for electrical lines, a coupling point for the pressure-medium line is provided and the coupling pin and the coupling sleeve of this coupling point have axial bores and terminal hose connections, and a nonreturn valve is arranged in the axial bore of the coupling sleeve and can be pressed upon by the coupling pin penetrating into the coupling sleeve.

EP2909893A1, which is incorporated by reference herein, relates to a further charging cable cooling system.

SUMMARY OF THE INVENTION

Described herein is a charging cable unit for a charging column of an electric filling station and a method for mounting such a charging cable unit.

An advantage of solutions presented herein lies in the fact that the cooling system can be delivered and mounted already filled without units having to be removed. Venting of the cooling circuit in situ can thus be avoided.

For charging cable cooling, the cooling circuit of the charging cable is connected only via a heat exchanger to the liquid cooling circuit of the charging column, which can use another cooling medium. Here, all the closures and couplings preferably allow quick mounting (quick couplings, etc.).

The cooling unit is preferably situated at a high point in the charging column. During mounting in situ, the cable together with cooling unit thus needs only to be lowered from above into the charging column.

The fixing of the charging cable is achieved only by some fixings of the jacket (in a clamping manner, at the outlet from the charging column and, where appropriate, in a supporting arm of the column) and by fixing or suspending the cooling unit within the changing column.

Further advantageous refinements of the invention are specified in the dependent patent claims. Thus, a corresponding arrangement according to aspects of the invention allows the charging cable to be threaded from outside into the vertical charging column. Here, an unwieldy element (cooling system, etc.) can also be introduced in a problem-free manner at the charging column-side end.

The solution presented here routes the cable over the roof. Alternatively, however, the solution can be used for any other leadthrough on a charging column without departing from the scope of the invention.

BRIEF DESCRIPTION OF THE DRAWINGS

An exemplary embodiment of the invention is illustrated in the drawings and described in more detail below.

DETAILED DESCRIPTION OF THE INVENTION

Figure 1:
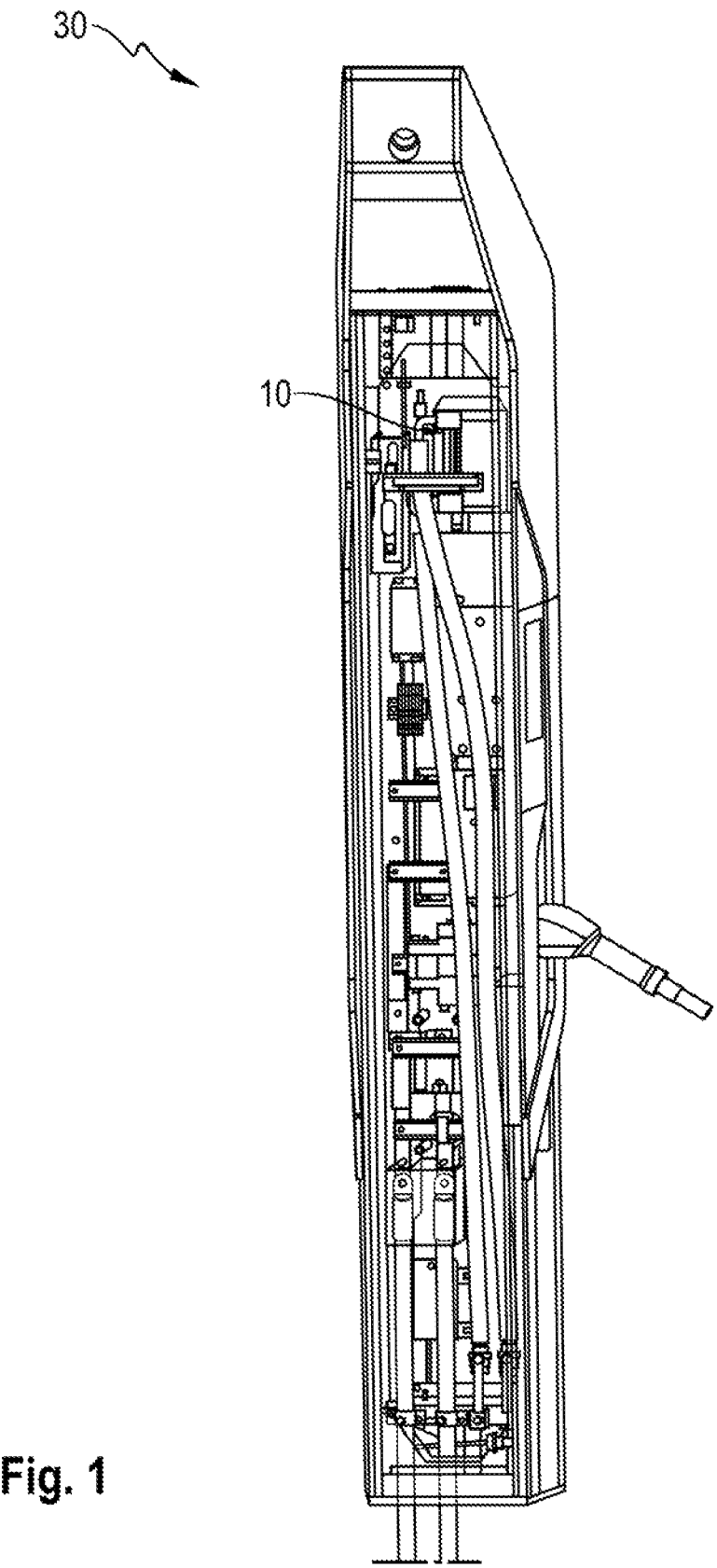
FIG. 1 shovers the perspective view of a first charging column.

FIG. 1 illustrates the basic structure of the proposed charging column (30). As a feature essential to the invention, the charging column (30) comprises a cooling unit (10) which cools the closed secondary coolant circuit of the charging column (30) if the charging column (30) is fluidically connected to the common primary coolant circuit of a plurality of charging columns of an electric filling station.

Figure 2:
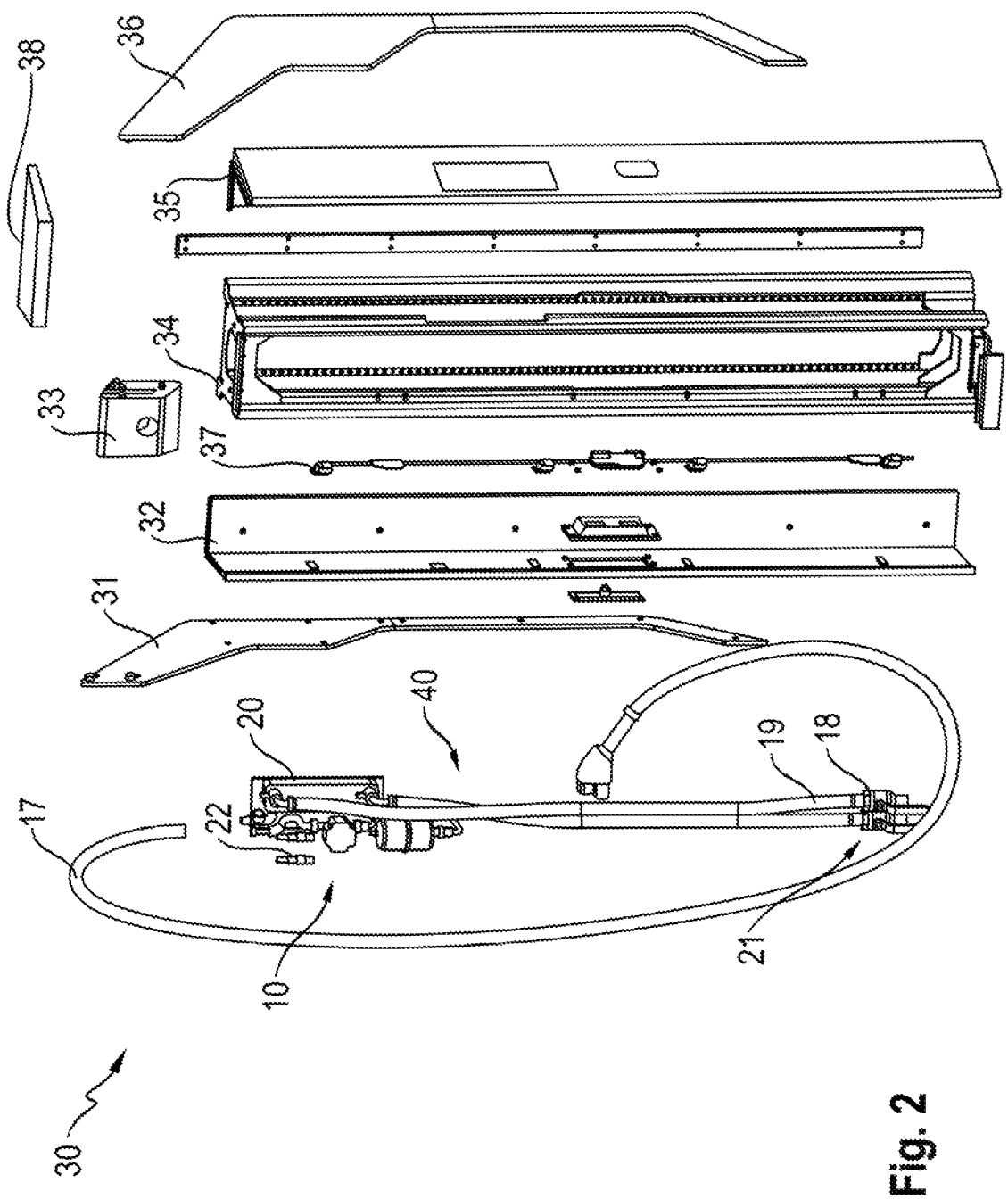
FIG. 2 shows the exploded illustration of a second charging column.
Figure 3:
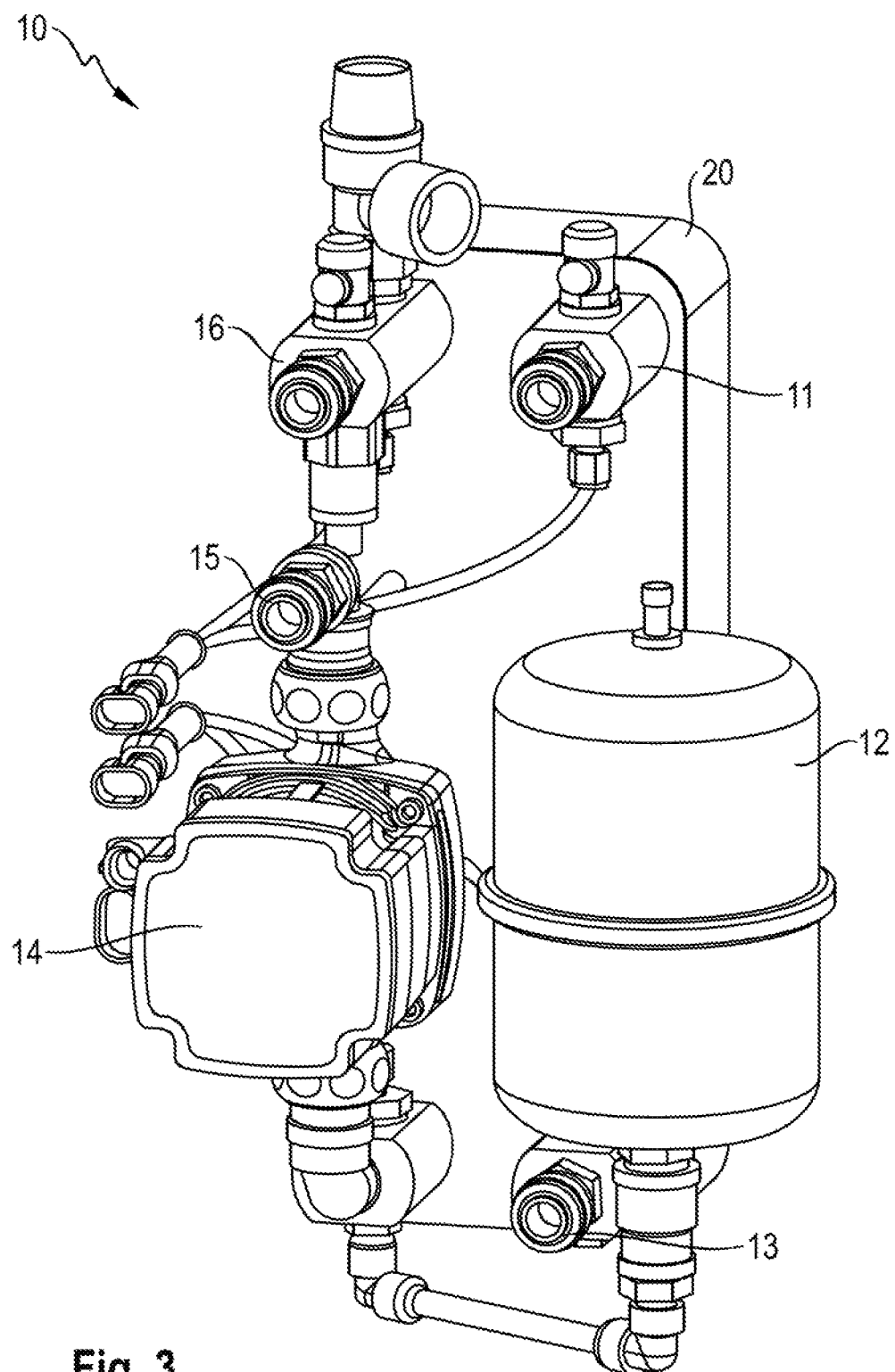
FIG. 3 shows the perspective view of a cooling unit of the second charging column.

This operating principle is illustrated by viewing the slightly differing embodiment according to FIG. 2 together with its cooling unit (10) represented in detailed form in FIG. 3: the cooling unit (10) is accordingly based on a heat exchanger (20) with first connections (11, 13) and second connections (15, 16). Whereas the first connections (11, 13) are connected to the connection points (21) of the primary coolant circuit via two hoses (19) having shut-off cocks (18), the second connections (15, 16) supply the secondary coolant circuit via a pump (14) with an expansion tank (12), with the heat of said secondary coolant circuit being intended to be transmitted to the primary coolant circuit via the heat exchanger (20). Whereas the primary coolant circuit typically channels a water-glycol mixture, the secondary coolant circuit can thus be filled with a synthetic methoxyhepta- or -nonafluoropropane, marketed for example under the tradename "Novec", hydrofluoroether, fluoroketone or some other nonconducting and as far as possible reaction-inert fluid.

The such prefabricated charging cable unit (40) with cooling system can be lowered in a mounting-friendly manner into the inner framework (34) of the charging column (30), which inner framework is also represented in FIG. 2 and the housing of which is formed by outer walls (32, 35) with externally bearing cantilever plates (31, 36) composed of resin mat (sheet molding compound, SMC) and in the present case is accessible via a locking mechanism (37) of the left outer wall (32). An upper cable holder (33) and a roof (38) with a drip edge are arranged in a form-fitting manner between the upper (in the drawing) ends of the cantilever plates (31, 36). The cable holder (33) for its part is composed of two injection-molded parts which, by means of two clearances formed in a complementary manner, receive the cooled charging cable (17) between them.

Figure 4:
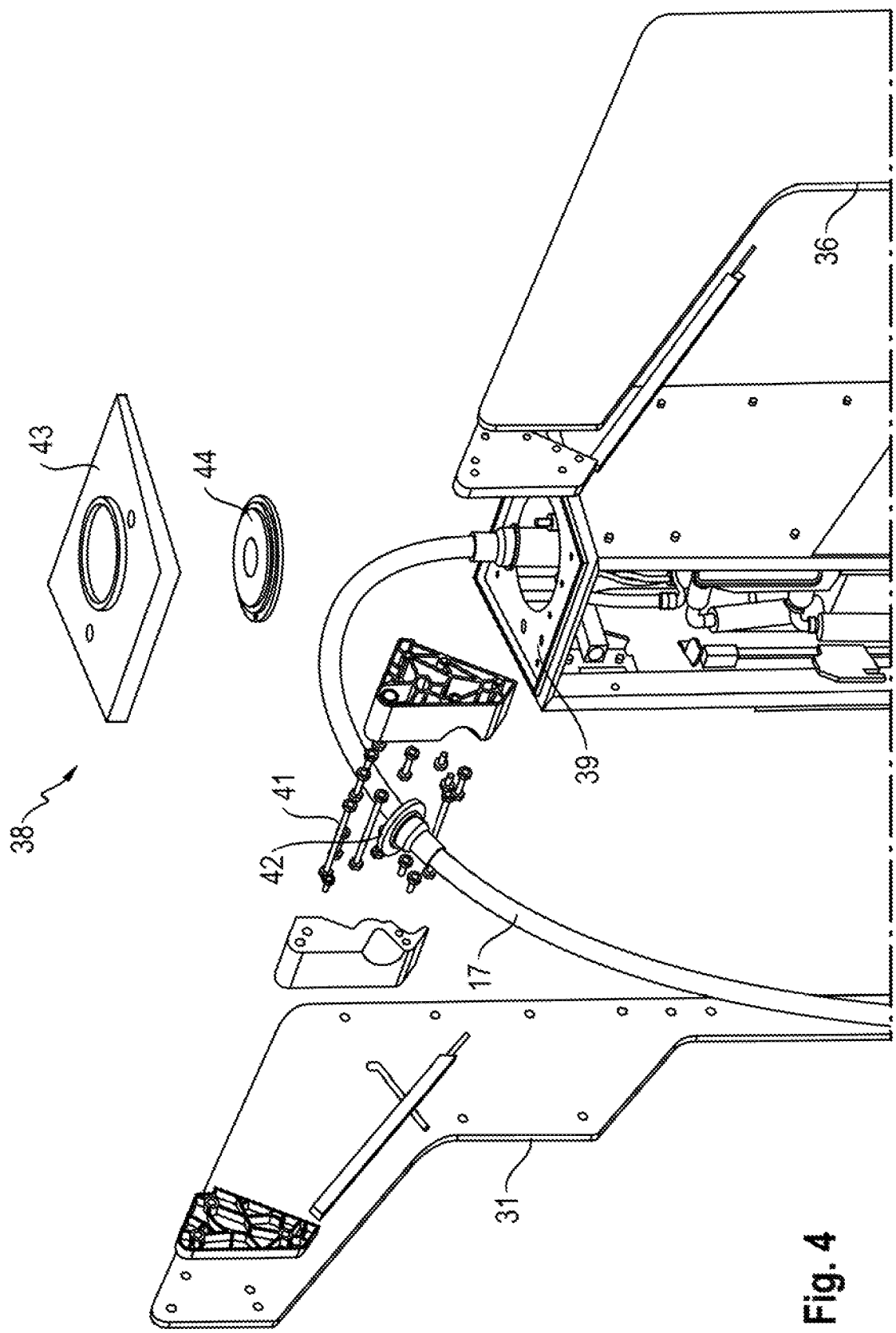
FIG. 4 shows the partial exploded illustration of a third charging column.

This mounting operation will now be explained with reference to the third embodiment of a charging column (30) according to FIG. 4: the charging cable unit (40) preferably already fits through the depicted metallic roof frame (39) having a round cutout; otherwise, this roof frame (39) is only subsequently introduced via the plug side of the charging cable (17).

A sealing plate (44)—which is circular here and produced from plastic, for example—is then pushed over the cover. This sealing plate (44) can already be threaded onto the delivered charging cable (17). In this case, it can furthermore be fixed and sealed to the charging cable (17) by adhesive bonding or ensure its sealing tightness by radial pressure. In the last-mentioned case, the inner side of the sealing plate (44) is preferably elastic or covered with an elastic material.

Alternatively, the charging cable unit (40) with cooling system is inserted into the charging column (30) from the front through a door opening and the plug of the charging cable (17) is guided through the roof opening. In this mounting step—as described above—, the sealing plate (44) is already threaded onto the charging cable (17) and, where appropriate, fixed. Finally, a roof plate (43)—which is designed to be quadrangular here—is applied and, because of the sealing plate (44) present, can have a larger cutout in the center in order to be threaded in situ from the plug side onto the charging cable (17).

Here, the sealing plate (44) is preferably a plastic injection-molded part with a sealing ring. The roof plate (43) can be a plastic injection-molded part or metal part, for example. The depicted supporting arm is optional and not absolutely necessary to implement the invention. If it is present, a strain-relief means (42) at the end of the supporting arm is advantageous. If it is not present, a corresponding strain-relief means (42) can be mounted on the roof or be integrated into the sealing plate (44).

The strain-relief means (42) can consist, for example, of conventional ring of elastic material such as plastic, nitrile butadiene rubber (NBR) or some other rubber around the charging cable (17) and of at least one plastic enclosure or other locking means which exerts pressure on the elastic ring. The ring can either be threaded in already in the delivered state of the charging cable unit (40) or slotted.

Alternatively, the strain-relief means (42)—which is here produced from nickel-plated brass—can be threaded onto the charging cable (17) and adhesively bonded at the correct point or fixed in some other way. Its initial positioning at the correct point prevents it having to be oriented in situ. Here, the selected position determines the length of the arc from the roof to the end of the supporting arm and the length of the charging cable (17) from the supporting arm, said lengths in turn determining whether the charging cable (17) rubs against the ground or extends up to the charging port for the intended maneuvers and car charging socket positions. The fixed strain-relief means (42) is positioned radially by the two depicted plastic half-shells with a screwed cable holder (41) and fixed axially—note the negative recesses for the "disk".

What is claimed is:

1. A charging cable unit for a charging column of an electric filling station, said charging cable unit comprising:
   a cooling unit comprising a heat exchanger with first connections and second connections, wherein the first connections are configured to be fluidically connected to a common primary coolant circuit of the electric filling station that is fluidically connected to multiple charging columns of the electric filling station, and wherein the second connections are fluidically connected to a secondary coolant circuit for cooling the charging column; and
   a charging cable for distributing electricity to a vehicle;
   wherein the cooling unit is configured to cool the secondary coolant circuit when the first connections are fluidically connected to the common primary coolant circuit of the electric filling station by transferring heat from the secondary coolant circuit to the common primary coolant circuit.

2. The charging cable unit as claimed in claim 1, wherein the cooling unit comprises a pump that is fluidically connected to the second connections.

3. The charging cable unit as claimed in claim 2, wherein the cooling unit comprises an expansion tank that is fluidically connected to the pump.

4. The charging cable unit as claimed in claim 1, wherein the secondary coolant circuit is filled with a reaction-inert fluid.

5. The charging cable unit as claimed in claim 1, wherein the secondary coolant circuit is filled with inert nonconducting fluid.

6. The charging cable unit as claimed in claim 1, wherein the secondary coolant circuit is filled with methoxyheptafluoropropane, methoxynonafluoropropane, hydrofluoroether or fluoroketone.

7. The charging cable unit as claimed in claim 1, wherein the charging cable unit comprises hoses for connection to the primary coolant circuit, and the first connections are fluidically connected to the hoses.

8. The charging cable unit as claimed in claim 7, wherein the hoses have shut-off cocks and connection points for connecting to the primary coolant circuit, and the shut-off cocks are arranged at the connection points.

9. The charging cable unit as claimed in claim 1, wherein the first connections are fluidically connected to the common primary coolant circuit of the electric filling station.

10. The charging cable unit as claimed in claim 1, further comprising the common primary coolant circuit of the electric filling station.

11. A charging column comprising the charging cable unit of claim 1.

12. An electric filling station comprising the charging column of claim 11 in addition to a plurality of other charging columns, wherein the common primary coolant circuit is fluidically connected to all of the charging columns of the electric filling station.

13. A method of mounting a charging cable unit for a charging column of an electric filling station having a common primary coolant circuit, said method comprising:
arranging the charging column at the electric filling station,
mounting the charging cable unit in the charging column below a roof frame of the charging column,
connecting the common primary coolant circuit to connection points on the charging cable unit, the common primary coolant circuit being connected to other charging columns of the electric filling station, and
installing a roof plate by threading the roof plate onto a charging cable of the charging cable unit and mounting the roof plate to the charging column.

14. The method as claimed in claim 13, further comprising:
lowering the charging cable unit into the charging column from above, and
pushing a sealing plate over the roof frame.

15. The method as claimed in claim 13, further comprising:
inserting the charging cable unit into the charging column from a front facing direction through a door opening, and
leading the charging cable upwardly out of the charging column.

16. The method as claimed in claim 13, further comprising:
threading a strain-relief onto the charging cable, and
axially fixing the strain-relief with respect to the charging cable using a cable holder.

* * * * *